United States Patent [19]
Rajput

[11] 4,090,741
[45] May 23, 1978

[54] ANTI-SKID BRAKE CONTROL SYSTEM WITH CIRCUIT FOR MONITORING SLOWER WHEEL

[75] Inventor: Yudh Vir Rajput, Dayton, Ohio

[73] Assignee: The B. F. Goodrich Company, Akron, Ohio

[21] Appl. No.: 770,535

[22] Filed: Feb. 22, 1977

[51] Int. Cl.² ............................................... B60T 8/02
[52] U.S. Cl. ...................................... 303/96; 303/105; 303/106
[58] Field of Search .................. 303/96, 97, 105, 106, 303/92; 307/355, 357, 215; 340/248 A; 361/242

[56] References Cited

U.S. PATENT DOCUMENTS

| | | | |
|---|---|---|---|
| 3,245,727 | 4/1966 | Anderson | 303/97 |
| 3,340,883 | 9/1967 | Peternel | 361/242 |
| 3,764,182 | 10/1973 | Andreyko | 303/96 |
| 3,833,268 | 9/1974 | Fleagle | 303/106 |
| 3,880,475 | 4/1975 | Booher | 303/106 |
| 4,005,909 | 2/1977 | Jones | 303/106 |

*Primary Examiner*—Trygve M. Blix
*Assistant Examiner*—Reinhard J. Eisenzopf
*Attorney, Agent, or Firm*—Harry F. Pepper, Jr.; W. A. Shira, Jr.

[57] ABSTRACT

In an anti-skid brake control system the rotational speed of a pair of wheels on a common axle of a vehicle is monitored. A NAND gate distinguishes the slower wheel and passes an electrical signal indicative of that wheel speed to deceleration, acceleration, and/or wheel lock detector circuits. A control mechanism initiates at least partial overriding of the vehicle brake system when the slower wheel deceleration or acceleration detected exceeds a predetermined amount or when a locked wheel condition is detected.

15 Claims, 3 Drawing Figures

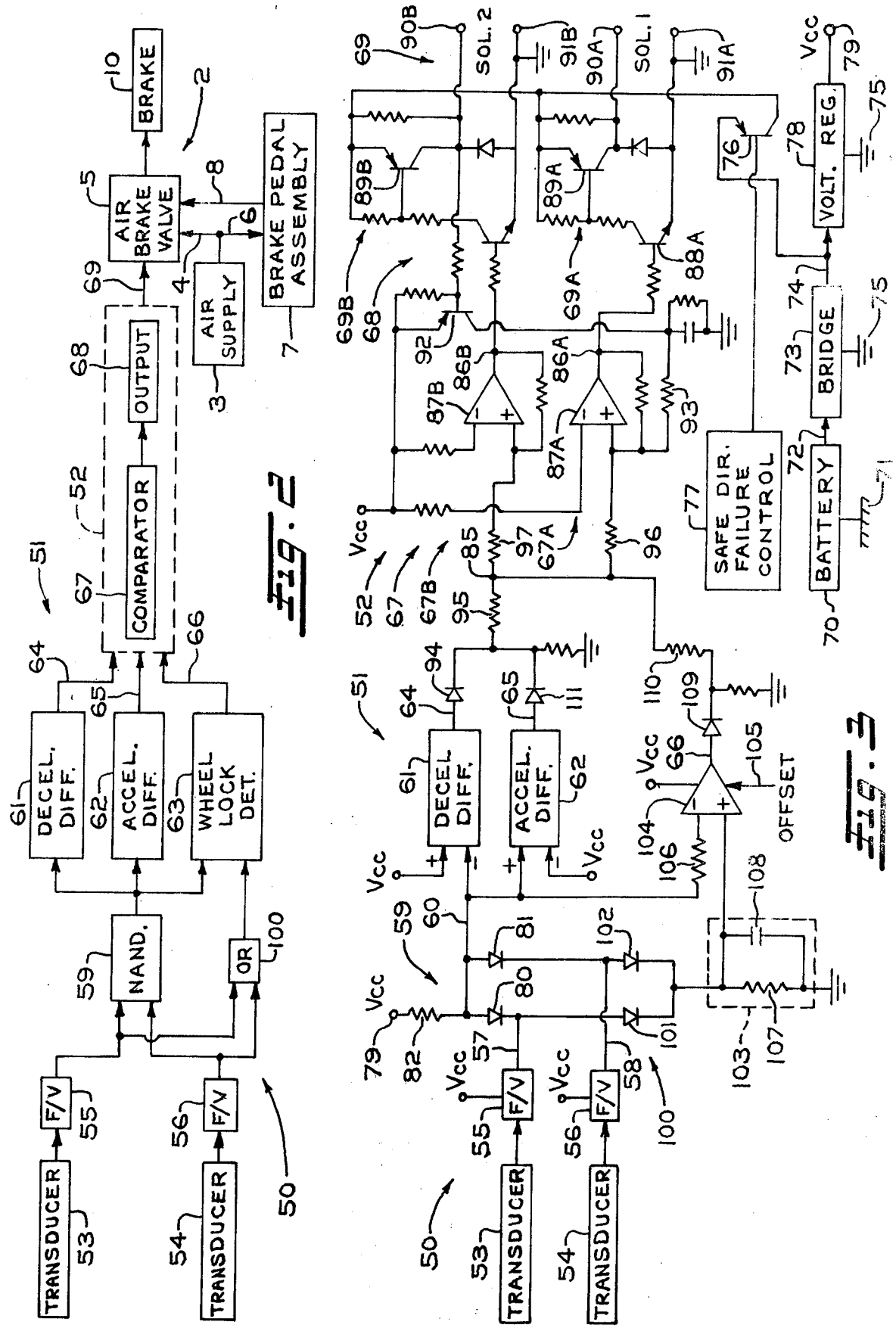

ANTI-SKID BRAKE CONTROL SYSTEM WITH CIRCUIT FOR MONITORING SLOWER WHEEL

BACKGROUND OF THE INVENTION

The present invention relates generally to an anti-skid brake control system and, more particularly, to such a system that detects changes in the speed of the more slowly rotating one of a plurality of vehicle wheels monitored by the system.

Anti-skid brake control systems are shown in U.S. Pat. No. 3,917,359 and in co-pending U.S. patent applications Ser. No. 685,267, filed May 11, 1976, for "Anti-Skid Brake Control System With Short Circuit Protection" now U.S. Pat. No. 4,040,676, issued Aug. 9, 1977, and Ser. No. 769,255, filed Feb. 16, 1977, for "Anti-Skid Brake control System With Power-Up Delay". Both of the mentioned applications are assigned to the same assignee as the present application.

It is the principal purpose of an anti-skid brake control system to provide automatic overriding control of the brakes of the vehicle when an incipient or actual skid or a locked wheel condition exists. Upon detecting such condition, the system dumps part or all (hereinafter a percentage) of the brake operating fluid pressure (hereinafter air pressure) which the vehicle operator then may be attempting to apply manually by pressing on the vehicle brake pedal with his foot, for example.

In such a system a transducer detects the rotational speed of a vehicle wheel and produces an AC transducer signal having a frequency representative of the wheel speed. A frequency to voltage converter produces a DC voltage that has an amplitude indicative of the frequency of the AC transducer signal and, thus, representative of the wheel speed.

A deceleration detector monitors downward-going changes in the DC voltage indicative of wheel deceleration and produces a deceleration signal representative of the magnitude of such deceleration. If the deceleration exceeds a predetermined threshold amount, which would be indicative of an incipient or actual skid condition of the wheel, the system dumps a percentage of the air pressure. Moreover, in case the wheel locks up, for example, whereupon there would be no further deceleration thereof, a wheel lock detector detects the same and continues the pressure dump until the wheel spins up again by at least a minimum amount. However, it has been found undesirable to re-apply full braking force to a relatively rapidly moving vehicle promptly after a wheel locked condition has terminated, for the wheel may too easily lock again; therefore, an acceleration detector monitors upward-going changes in the DC voltage indicative of wheel acceleration and produces an acceleration signal which if over a threshold level causes dumping of some, less than all, of the air pressure then being called for by the driver.

When a pair of wheels on a common axle but on opposite sides of the vehicle are to be monitored by an anti-skid brake control system as above, a separate transducer is coupled relative to each wheel to produce a pair of AC transducer signals having respective frequencies indicative of the respective wheel speeds. A pair of frequency to voltage converters convert those AC signals to respective generally DC voltages. Moreover, in the past a pair of deceleration differentiating circuits have been coupled to monitor the respective DC voltages and to produce respective deceleration signals representative of the deceleration of the respective wheels, and the two deceleration signals were combined, for example, in an OR gate and delivered to a control circuit. If either of the deceleration signals exceeded a predetermined threshold value, then the control circuit would produce an output signal effecting dumping of a percentage of the air pressure being called for by the vehicle driver. Similarly, a pair of acceleration differentiating circuits have been coupled to the respective frequency to voltage converters to produce respective acceleration signals indicative of wheel acceleration or spin-up, and the acceleration signals were combined in another OR gate and delivered to the control circuit to effect a pressure dump if either acceleration signal exceeded a predetermined amount. Accordingly, for each monitored wheel it was necessary to have a transducer, a frequency to voltage converter, a deceleration differentiating circuit, and an acceleration differentiating circuit, and the respective deceleration and acceleration signals produced by these components were delivered to a common control circuit.

In U.S. Pat. No. 3,847,446 there is disclosed a skid control system for tandem axled vehicles. Such system is intended to control the brakes of adjacent tandem wheels, i.e. those on the same side of the vehicle on two closely adjacent axles. Several embodiments are disclosed in such patent including one in which an incipient skid condition must be detected at both wheels before air pressure can be dumped and another in which the pressure dump is at least partially disabled when the first of the two wheels spins up. However, in all of the embodiments disclosed in such patent for each wheel monitored there is required a sensor mechanism that produces a voltage indicative of the wheel speed, a deceleration differentiating circuit, and an acceleration differentiating circuit, and there is a common control circuit, then, that effects a pressure dump when necessary.

SUMMARY OF THE INVENTION

In the anti-skid brake control system of the present invention the deceleration and acceleration of the more slowly rotating one of at least two of the vehicle wheels monitored by the system are detected and when that deceleration or acceleration exceeds a predetermined threshold amount a pressure dump is initiated by a control mechanism. In a preferred embodiment the monitored wheels are on a common axle on opposite sides of the vehicle. Moreover, a pressure dump may be caused by detection by the wheel lock detector of a wheel in a locked condition.

It has been found that ordinarily under braking action the more slowly rotating one of a plurality of the vehicle wheels would be the one that resulted from the fastest deceleration in the event of an incipient or actual skid condition. Therefore, the magnitude of the deceleration of that more slowly rotating wheel is selected to be monitored by the anti-skid brake control system in accordance with the invention.

Furthermore, after a skid or a locked wheel condition has existed, the more rapidly rotating one of, for example, a pair of vehicle wheels on opposite sides of the vehicle is the one that has picked up friction contact with the road surface more rapidly than the more slowly rotating wheel, which still might be sliding on a slick road surface. Accordingly, it also has been found that effecting a pressure dump in response to acceleration of the more rapidly rotating wheel may cause a hazardous rapid turning action of the vehicle. However, this problem is avoided in the present invention in which it is the acceleration of the more slowly rotating one of a plurality of vehicle wheels that is effectively controlling and employed to produce any necessary pressure dump as the wheels spin up.

In one preferred embodiment of the invention the plural substantially DC voltages produced by respective transducer and frequency to voltage converters associated with respective wheels monitored by the anti-skid brake control system are combined in a NAND gate, which delivers the lower DC voltage, i.e. that representing the more slowly rotating wheel, to a single deceleration differentiating circuit and/or to a single acceleration differentiating circuit. The deceleration and acceleration signals are delivered to the control circuit, which determines whether or not and/or how much air pressure is dumped. Thus, the number of deceleration differentiating circuits and acceleration differentiating circuits is reduced to one of each regardless of the number of wheels being monitored and controlled by a single anti-skid brake control system including the common control circuit thereof.

With the foregoing in mind, it is a primary object of the invention to reduce the number of components required in an anti-skid brake control system.

Another object is to increase the efficiency and reliability and to reduce the cost of an anti-skid brake control system.

An additional object is to detect the deceleration and acceleration of the more slowly rotating one of a plurality of vehicle wheels as an indication of an incipient or actual skid condition and a subsequent wheel spin-up to effect operation of an anti-skid brake control system that may at least partially override manual operation of the vehicle brake system.

A further object is to reduce the number of differentiating circuits, including particularly the deceleration differentiating and acceleration differentiating circuits, and, thus, the number of inputs to the control mechanism of an anti-skid brake control system.

These and other objects and advantages of the present invention will become more apparent as the following description proceeds.

To the accomplishment of the foregoing and related ends the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 2 is a block diagram illustrating an anti-skid brake control system in accordance with the invention as employed in conjunction with the air brake system of a vehicle; and FIG. 3 is a schematic electric circuit diagram, partly in block form, illustrating details of the anti-skid brake control system of FIG. 2.

DESCRIPTION OF THE PREFERRED EMBODIMENT

Figure 1:
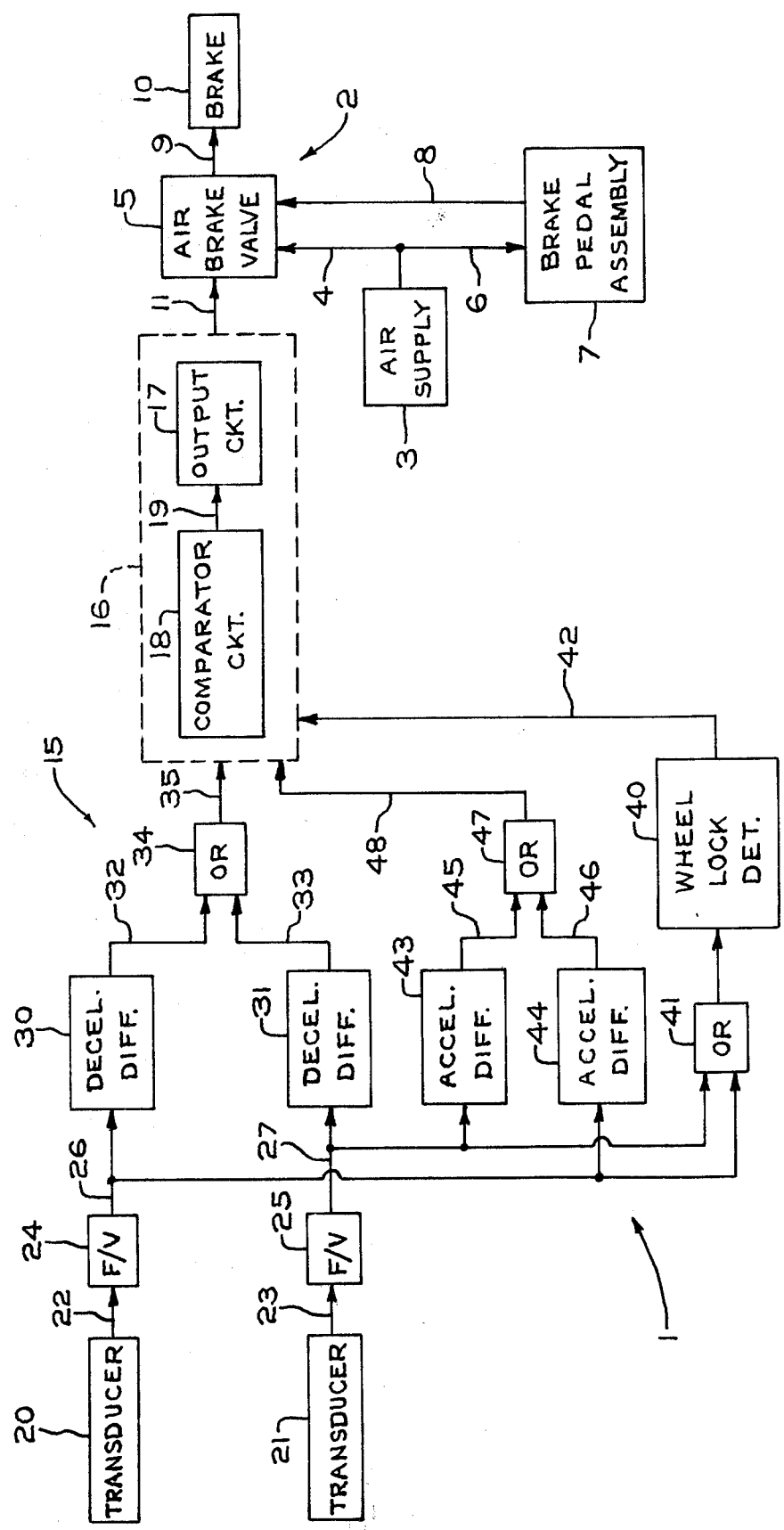
FIG. 1 is a block diagram illustrating a prior art arrangement of components of an anti-skid brake control system in conjunction with the air brake system of a vehicle.

Referring now more particularly to the drawings, wherein like reference numerals designate like parts in the several figures, a prior art anti-skid brake control system is generally indicated at 1 in FIG. 1. Such system is coupled for overriding manual control of a conventional air brake system 2 of a vehicle, such as a truck, not shown. In the air brake system 2 a primary supply of air pressure from the vehicle air supply 3 is provided via a fluid connection 4 to a conventional air brake valve 5 and via a fluid connection 6 to the brake pedal assembly 7. The driver may manually operate the brake pedal by his foot, for example, to determine the amount of control air pressure supplied via fluid line 8 to the air brake valve 5 to open the latter a corresponding amount, thereby to provide a controlled amount of brake operating primary air pressure delivered via the fluid line 9 to the vehicle air brakes 10 to operate the same to slow the vehicle in conventional manner.

The purpose of the anti-skid brake control system of 1, as noted, is to override manual control of the air brake system 2 when an incipient or actual skid, a locked wheel or a too rapid spin-up condition has been detected. Accordingly, the valve 5 includes a modulator valve portion, not shown, that may be solenoid operated in conventional manner to dump a percentage of the air pressure being called for by the driver in response to a dump signal delivered on the electrical output 11 of the system 1. The dump signal energizes one or more solenoids in the modulator portion of the air brake valve 6 to dump air pressure, thereby allowing the skidding wheel or wheels to regain traction with the road. Various types of modulator valve portions for air brake valves are found in the prior art patent literature.

One particular type of valve with which the system 1 may be used is specifically disclosed in a brochure entitled "Triple Action Skid Control", published by B. F. Goodrich Company, March, 1975. The valve disclosed in such brochure includes a pair of solenoids. When neither solenoid is energized, all of the air pressure being called for by the driver is delivered to the brakes. When either of the solenoids is selectively energized by the anti-skid brake control system one-third or two-thirds of the called for air pressure is dumped, and when both solenoids are energized all of the air pressure being called for by the driver is dumped. Of course, when air pressure is dumped the braking of the wheel or wheels is partly or totally terminated at least for a brief period of time to allow the wheel or wheels to regain proper frictional contact with the road surface.

The system 1 includes a detector portion 15, which detects the actual speed condition of the vehicle wheels monitored, and a control portion 16, which effects production of the dump signal on the electrical output 11 depending on certain wheel conditions detected by the detector portion 15.

The control portion 16 includes an output circuit 17, which produces respective dump signals on the electrical output 11 to operate the respective solenoids of the air brake valve 5, and a comparator circuit 18, which controls the output circuit. In response to the magnitude of the largest electrical input to the comparator circuit 18 from the detector portion 15 the comparator circuit will produce a signal on line 19 causing the output circuit to produce no dump signal or to produce a dump signal that will effect dumping of one-third, two-thirds or all of the air pressure being called for by the driver.

The detector portion 15 includes a pair of conventional transducers 20, 21, which are coupled to the monitored wheels to produce respective AC transducer signals on lines 22, 23 with such signals having frequencies indicative of the respective wheel speeds. A pair of conventional frequency to voltage converter circuits 24, 25 convert the transducer signals to respective DC voltages on lines 26, 27. The amplitudes of the DC voltages on lines 26, 27 are representative of the wheel speeds.

A pair of deceleration circuits 30, 31 monitor downward-going changes in the respective DC voltages on lines 26, 27. The deceleration circuits 30, 31 may be conventional differentiating circuits that produce deceleration signals on lines 32, 33 representing the rates of downward change of the DC voltages and, thus, the deceleration of the respective wheels. An OR gate 34 delivers via lines 35 the larger of the two deceleration signals to the control portion 16. When the magnitude of the deceleration signal on line 35 is below a predetermined threshold level set or biased in the comparator circuit 18, no output will be produced on line 19, and the output circuit 17 will not produce a dump signal. At that time the air brake system 2 will be fully under manual control of the driver. However, if the magnitude of the deceleration signal on line 35 exceeds a first, a second, or a third predetermined threshold level or amplitude, the comparator circuit 18 will produce on line 19 a signal that causes the output circuit 17 to produce a dump signal that energizes a first, a second, or both, respectively, of the solenoids in the air brake valve 5 to dump one-third, two-thirds, or all, respectively, of the air pressure called for by the driver.

Accordingly, if the vehicle wheels decelerate in normal manner under normal braking conditions, the value of the deceleration signal on line 35 will be below that required to produce a dump signal and the driver will have full control of the air brake system 2. However, if the vehicle is undergoing a small, medium, or large skid represented by small, medium, or large deceleration of one of the wheels above normal deceleration, one-third, two-thirds, or all of the air pressure being called for by the driver will be dumped.

A wheel lock detector 40 also monitors the respective DC voltages on lines 26, 27 via an OR gate 41. In the event that either of the wheels tends to lock up, for example changing its rotational speed to a near zero speed substantially instantaneously, the wheel lock detector 40 will produce a wheel locked signal on line 42. The wheel locked signal is delivered to the comparator circuit 18 of the control portion 16 and causes the latter to energize the output circuit 17 to produce a dump signal. More specifically, in a preferred embodiment the amplitude of the wheel locked signal would be sufficiently large to cause the comparator circuit 18 to operate the output circuit 17 to energize both solenoids in the air brake valve 5 to dump all of the air pressure then being called for by the driver. The wheel lock detector 40 may include a minimum speed monitor circuit, not shown, that monitors the value of the DC voltage levels on lines 26, 27 to discontinue the wheel locked signal when the wheels are spinning at a speed above a predetermined speed.

A pair of acceleration circuits 43, 44 are coupled to the lines 26, 27, respectively, to monitor particularly the upward or positive-going changes in the DC voltages thereon. The acceleration circuits 43, 44 may be conventional differentiating circuits that produce on lines 45, 46 respective acceleration signals indicative of the acceleration or spin-up rates of the respective wheels. An OR gate 47 delivers the larger of the two acceleration signals via line 48 to the comparator circuit 18.

The acceleration circuits assure that after a wheel has been in a locked condition, the wheel lock detector has dumped all the air pressure then being requested, the wheel has begun to spin up, and the driver is still requesting air pressure for braking purposes, full air pressure cannot be applied if the wheel spins up too fast, for that would cause the wheel to lock again. Rather, the acceleration circuits allow only percentage of the requested air pressure to be applied to the brakes under those conditions so that wheel will spin up at a controlled rate while trying to regain traction with the road surface. When a locked wheel later accelerates too rapidly, the amplitude of the acceleration signal on line 48 will cause the comparator circuit 18 to operate the output circuit 17 to energize the second solenoid in the air brake valve 5 so that two-thirds of the air pressure then being called for by the vehicle driver will be dumped. Therefore, during excessively rapid spin-up of the previously locked vehicle wheel after the wheel lock detector has stopped producing a wheel locked signal some air pressure being called for by the vehicle driver may be applied to the brakes of that wheel; conversely, some of the air pressure being called for by the vehicle driver is dumped at that time.

An improved anti-skid brake control system in accordance with the invention is generally indicated at 50 in FIGS. 2 and 3. The system 50 includes a detector portion 51 for detecting the condition of a pair of vehicle wheels and a control portion 52, which effects dumping of air pressure in varying amounts as determined by the detector portion.

The detector portion includes a pair of conventional transducers 53, 54 and a pair of frequency to voltage converters 55 and 56 which produce respective substantially DC voltages on lines 57, 58 in the manner described above. The amplitudes of the respective DC voltages are, therefore, representative of the respective wheel speeds.

A NAND gate 59 delivers to line 60 the smaller of the two DC voltages indicative of the speed of the more slowly rotating one of the two monitored wheels. The DC voltage on line 60 is then delivered to a single deceleration circuit 61, a single acceleration circuit 62, and a wheel lock detector 63, each of which is similar in construction and operation to the corresponding elements described above with reference to FIG. 1. Moreover, the output lines 64, 65, 66 from the deceleration, acceleration and wheel lock detector circuits, respectively, are coupled to a comparator 67 in the control portion 52. An output circuit 68 controlled by the comparator 67 in the control portion 52 produces the respective dump signals on the electrical output 69 of the system 50 to effect control of the air brake valve 5 of the air brake system 2 to dump varying percentages of the air pressure being called for by the vehicle driver depending on the wheel conditions detected by the detector portion 51.

Turning now more specifically to FIG. 3, electrical power for the system 50 is derived from the vehicle battery 70, which is connected between the chassis ground reference potential 71 and an output terminal 72. Preferably the output terminal 72 is of a relatively positive potential, for the system 50 as illustrated is designed to operate on a positive input voltage; however, it will be appreciated that the system 50 could be conveniently modified in conventional manner to operate in response to a relatively negative input voltage power supply. In any event, a polarity correcting bridge 73 provides a positive unregulated voltage on line 74 relative to a circuit ground reference potential 75, and that unregulated voltage is controllably supplied via a power transistor 76 to provide power to the first and second output circuit portions 69A, 69B, which will be described further below. A safe direction failure control circuit 77 is coupled by respective connections, not shown, to monitor various portions of the system 50, as is well known. Assuming that the monitored portions are operating properly, the safe direction failure control 77 will bias the power transistor 76 to conduction thereby providing the unregulated positive voltage to the two portions of the output circuit 69. The unregulated voltage on line 74 also is supplied to a voltage regulator 78, which provides a regulated positive Vcc voltage at terminal 79 with such voltage being coupled to similarly labeled terminals in the system 50 to energize the respective portions thereof.

The NAND gate 59 includes a pair of diodes 80, 81, which have their anodes coupled to the line 60 to which the Vcc voltage also is coupled via a resistor 82. The cathodes of the diodes 80, 81 are coupled to the respective lines 57, 58. Therefore, the voltage appearing on line 60 will be clamped to the amplitude of the lower or smaller of the two substantially DC voltages on line 57, 58 representative of the more slowly rotating of the two wheels being monitored.

When braking is called for by the driver and there is no incipient or actual skidding or locked wheel condition being detected by the detector portion 51, the amplitude of the voltage at a junction 85 of the detector and control portions 51, 52 will be relatively low. Therefore, the output terminals 86A, 86B of comparator amplifiers 87a, 87b in the two comparator portions 67A, 67B of the comparator 67 will be at a relatively low voltage and transistors 88A, 88B in the output circuit portions 69A, 69B will be cut off. The power transistors 89A, 89B also will be cut off, and insufficient voltage will be delivered to the respective output terminals 90A, 91A, 90B, 91B so that the respective solenoids in the air brake valve 5 will be deenergized.

A transistor 92 monitors the power transistor 89B. Since the power transistor 89B is non-conductive at this time, the transistor 92 will be conductive so that a current, which is delivered via a resistor 93 to the non-inverting input above the comparator amplifier 87A, effectively reduces the current bias required from the junction 85 to turn on that comparator amplifier to produce a high voltage at its output terminal 86A.

If the driver applies the brakes and the more slowly rotating wheel starts to skid, whereby it decelerates more rapidly than it ordinarily should, the clamped voltage level on line 60 will drop relatively rapidly, and the deceleration differentiating circuit 61 will produce a relatively large voltage on line 64. This voltage is coupled via a NOR'ing diode 94 and a resistor 95 to the junction 85. Assuming that the amplitude of the voltage at the junction 85 is sufficient to supply a current through a resistor 96 to turn on the comparator amplifier 87A such that a high or relatively positive voltage is produced at its output terminal 86A, that latter voltage turns on transistor 88A, which in turn effects conduction in the power transistor 89A. The positive unregulated voltage from the power transistor 76 is then delivered to the output terminal 90A to energize the first solenoid in the air brake valve 5 to dump one-third of the air pressure being called for by the driver.

However, if the deceleration of the more slowly rotating vehicle wheel is still larger, such that the voltage at the junction 85 is large enough to provide a sufficient current through a resistor 97 to turn on the comparator amplifier 87B causing the latter to produce a high voltage at its output terminal 86B, that high voltage will turn on the transistor 88B, which in turn effects conduction in the power transistor 89B. Therefore, the unregulated positive voltage from the power transistor 76 will be provided to the output terminal 90B to energize the other solenoid, which would cause dumping of two-thirds of the air pressure being called for by the driver. Moreover, conduction by the transistor 89B will effect cut off of the transistor 92, whereupon the current through the resistor 93 to the comparator amplifier 87A is terminated, and the required bias current through the resistor 96 to effect turn on of that comparator amplifier is appreciably increased. Therefore, assuming that the voltage at the junction 85 is insufficient to provide such bias current, the voltage at the output terminal 86A of the comparator amplifier 87A will drop to a low level, whereupon the transistor 88A and the power transistor 89A will cease conduction and the first solenoid will be deenergized to assure that only two-thirds of the air pressure will be dumped.

However, if the deceleration signal at the output 64 from the deceleration circuit 61 is still larger, such that the amplitude of the voltage at the junction 85 is sufficient to provide the increased bias current through the resistor 96 again to cause a high voltage at the output terminal 86A of the comparator amplifier 87A, then in the manner described above the first solenoid again will be energized, this time simultaneously with the second solenoid.

The DC voltages on lines 57, 58 are supplied to the wheel lock detector 63 via an OR gate 100, which includes a pair of diodes 101, 102 to isolate the respective DC voltages. The wheel lock detector 63 includes a lock memory circuit 103 and a comparator amplifier 104, the latter having a conventional offset adjustment 105. The off-set adjustment 105 is set preferably in a manner that assures a low or relatively negative voltage output from the amplifier 104 when the voltage at the inverting input exceeds a predetermined threshold value indicating that both wheels are turning at least at a predetermined minimum speed.

The clamped voltage on line 60 is supplied via a resistor 106 to the inverting input of the amplifier 104 of the wheel lock detector 63, and the larger of the two DC voltages on lines 57, 58 is effectively supplied via the OR gate 100 to the lock memory, which includes a resistor 107 and a capacitor 108. When the effective magnitude of the voltage at the inverting input exceeds that at the non-inverting input of the amplifier, the latter will produce a low voltage output on line 66. However, when the effective magnitude of the voltage at the non-inverting input, which follows the voltage stored in the lock memory 103, exceeds that at the inverting input, assuming the latter is below its off-set threshold for minimum wheel speed, the amplifier will produce a high relatively positive wheel locked signal on line 66.

Since the amplitudes of the respective DC voltages on lines 57, 58 usually change relatively gradually as the vehicle wheels accelerate or decelerate under normal operating conditions, the voltage stored in the lock memory will generally follow the larger of the two DC voltages on those lines less the voltage drop across a respective one of the diodes 101, 102. However, if the amplitude of the smaller of the DC voltages on lines 57, 58 representing the slower wheel were to drop at a rate faster than the capacitor 108 could discharge through the resistor 107, which ordinarily would indicate that a wheel is locking up, the voltage at the non-inverting input of the comparator amplifier 104 would start to exceed that applied to the inverting input thereof, and a wheel locked signal would be produced on line 66. This wheel locked signal would pass through the NOR'ing diode 109 and resistor 110 to the junction 85. Preferably the amplifier 104 is a relatively high gain operational amplifier that produces the indicated high voltage output at a magnitude such that the amplitude at the junction 85 would be effective to operate both portions of the comparator 67 and both portions of the output circuit 68 to energize both of the solenoids to dump all of the air pressure then being called for by the driver.

After the vehicle wheels have locked up, for example, and the wheel lock detector 63 has effected dumping of all of the air pressure being called for by the driver, the wheels will tend to spin-up. However, if the more slowly rotating wheel accelerates at a rate above a predetermined acceleration threshold minimum, the acceleration circuit 62 will produce a relatively high acceleration signal voltage at its output line 65. This acceleration signal is passed via NOR'ing diode 111 and resistor 95 to the junction 85. Ordinarily, the maximum amplitude of the voltage produced at the junction 85 when such acceleration signal is produced by the acceleration circuit 62 would be effective to energize only the comparator circuit portion 67B to cause the output circuit portion 69B in turn on the second solenoid to dump two-thirds of the air pressure then being called for by the driver. Therefore, if the relatively larger wheel locked signal is being produced at the same time that the acceleration signal is being produced, the former will be controlling so that all of the air pressure will be dumped.

On the other hand, at some time the wheel locked signal will no longer be produced by the wheel lock detector 63, for example, because the wheels are rotating fast enough so the voltage at the inverting input of amplifier 104 exceeds the minimum threshold level, the capacitor voltage in the lock memory 103 has discharged, or the wheels have spun up and the the capacitor has partly discharged. However, at this time if the acceleration of the more slowly rotating wheel exceeds the acceleration threshold, an acceleration signal will be produced to effect dumping of two-thirds of the air pressure being called for by the driver. Of course, when the acceleration signal is no longer produced and the wheel locked signal also is no longer produced, the control portion 52 will deenergize both solenoids of the air brake valve 5 and full manual control of the air brake system 2 will be returned to the driver.

In view of the foregoing, it will be appreciated that although the invention was described with reference to an anti-skid brake control system that monitors two wheels on opposite sides of the vehicle on a common axle by respective transducers, the principles of the invention whereby the more slowly rotating one of a plurality of vehicle wheels is the one monitored by a single deceleration circuit and a single acceleration circuit, which in turn control a single control portion of the system, may be employed even when the indicated plurality is more than two vehicle wheels that are monitored by respective transducers.

The embodiments of the invention in which an exclusive property or privilege is claimed are defined as follows:

1. An anti-skid brake control system for overriding manual operation of the brakes of a vehicle having a plurality of wheels, comprising detector means for detecting the rate of change of rotation of the more slowly rotating one of at least two of said wheels, including transducer means for producing a plurality of electrical signals respectively representative of the speeds of said wheels, means for selecting the electrical signal representative of the more slowly rotating one of said wheels, deceleration differentiating means for differentiating such selected electrical signal to produce a deceleration signal representative of the deceleration of said one wheel, and acceleration differentiating means for differentiating such selected electrical signal to produce an acceleration signal representative of the acceleration of the said one wheel; wheel lock detector means for detecting the locking of at least one of said wheels, said wheel lock detector means having memory circuit means operatively coupled to said detector means for storing an electrical signal representative of the speed of at least one of said wheels, and comparator means for detecting a change in an electrical signal indicative of the actual speed of the more slowly rotating one of said wheels at a rate exceeding that at which said memory circuit discharges such stored electrical signal; and control means for effecting such overriding in response to detection of a predetermined deceleration or acceleration as represented by the magnitudes of such deceleration signal and acceleration signal, respectively, by said detector means or a locked wheel by said wheel lock detector means.

2. The system of claim 1, further comprising means for coupling said means for selecting to said comparator means, whereby said wheel lock detector means monitors the velocity of the more slowly rotating one of said wheels.

3. The system of claim 2, further comprising OR gate means coupled to all of such transducer means for delivering to said memory circuit means an electrical signal representative of the more rapidly rotating one of said wheels.

4. The system of claim 1, wherein said means for selecting comprises a NAND gate, and further comprising OR gate means coupled to all of said transducer means for delivering to said memory circuit means an electrical signal representative of the more rapidly rotating one of said wheels.

5. The system of claim 1, wherein said transducer means are coupled to respective wheels located on opposite sides of the vehicle on a common axle thereof.

6. The system of claim 1, further comprising valve means coupled to said control means and operative in response thereto to dump a percentage of the brake operating fluid pressure being called for by the vehicle driver.

7. The system of claim 1, wherein said means for selecting comprises a NAND gate.

8. The system of claim 7, further comprising valve means coupled to said control means and responsive thereto for dumping a percentage of the brake operating fluid pressure being called for by the vehicle driver.

9. The system of claim 7, wherein said transducer means are coupled to respective wheels on opposite sides of the vehicle and on a common axle thereof.

10. An anti-skid brake control system for overriding manual operation of the brakes of a vehicle having a plurality of wheels, comprising detector means for detecting the rate of change of rotation of the more slowly rotating one of at least two of said wheels, including transducer means for producing a plurality of electrical signals respectively representative of the speeds of said wheels, means for selecting the electrical signal representative of the more slowly rotating one of said wheels, and deceleration differentiating means for differentiating such selected electrical signal to produce a deceleration signal representative of the deceleration of said one wheel; wheel lock detector means for detecting the locking of at least one of said wheels, said wheel lock detector means having memory circuit means operatively coupled to said detector means for storing an electrical signal representative of the speed of at least one of said wheels, and comparator means for detecting a change in an electrical signal indicative of the actual speed of the more slowly rotating one of said wheels at a rate exceeding that at which said memory circuit discharges such stored electrical signal; and control means for effecting such overriding in response to detection of a predetermined deceleration as represented by the magnitude of such deceleration signal by said detector means or a locked wheel by said wheel lock detector means.

11. The system of claim 10, further comprising means for coupling said means for selecting to said comparator means, whereby said wheel lock detector means monitors the velocity of the more slowly rotating one of said wheels.

12. The system of claim 11, further comprising OR gate means coupled to all of such transducer means for delivering to said memory circuit means an electrical signal representative of the more rapidly rotating one of said wheels.

13. An anti-skid brake control system for overriding manual operation of the brakes of a vehicle having a plurality of wheels, comprising detector means for detecting the rate of change of rotation of the more slowly rotating one of at least two of said wheels, including transducer means for producing a plurality of electrical signals respectively representative of the speeds of said wheels, means for selecting the electrical signal representative of the more slowly rotating one of said wheels, and acceleration differentiating means for differentiating such selected electrical signal to produce an acceleration signal representative of the acceleration of the said one wheel; wheel lock detector means for detecting the locking of at least one of said wheels, said wheel lock detector means having memory circuit means operatively coupled to said detector means for storing an electrical signal representative of the speed of at least one of said wheels, and comparator means for detecting a change in an electrical signal indicative of the actual speed of the more slowly rotating one of said wheels at a rate exceeding that at which said memory circuit discharges such stored electrical signal; and control means for effecting such overriding in response to detection of a predetermined acceleration as represented by the magnitude of such acceleration signal by said detector means or a locked wheel by said wheel lock detector means.

14. The system of claim 13, further comprising means for coupling said means for selecting to said comparator means, whereby said wheel lock detector means monitors the velocity of the more slowly rotating one of said wheels.

15. The system of claim 14, further comprising OR gate means coupled to all of such transducer means for delivering to said memory circuit means an electrical signal representative of the more rapidly rotating one of said wheels.

* * * * *